US012576470B2

(12) United States Patent
Fahrner et al.

(10) Patent No.: US 12,576,470 B2
(45) Date of Patent: *Mar. 17, 2026

(54) ELECTRIC HAND TOOL

(71) Applicant: C. & E. Fein GmbH, Schwaebisch Gmuend-Bargau (DE)

(72) Inventors: Horst Fahrner, Stuttgart (DE); Juergen Blickle, Goeppingen (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 644 days.

This patent is subject to a terminal disclaimer.

(21) Appl. No.: 17/837,669

(22) Filed: Jun. 10, 2022

(65) Prior Publication Data

US 2022/0305607 A1 Sep. 29, 2022

Related U.S. Application Data

(63) Continuation of application No. PCT/EP2020/085002, filed on Dec. 8, 2020.

(30) Foreign Application Priority Data

Dec. 13, 2019 (DE) ..................... 20 2019 106 967.8

(51) Int. Cl.

*B24B 23/02* (2006.01)
*B24B 47/12* (2006.01)
*B25F 5/02* (2006.01)

(52) U.S. Cl.

CPC ............ *B24B 23/028* (2013.01); *B24B 47/12* (2013.01); *B25F 5/02* (2013.01)

(58) Field of Classification Search

CPC ....... B24B 23/028; B24B 23/02; B24B 47/12; B24B 41/007; B24B 55/045; B24B 55/052; B25F 5/02

See application file for complete search history.

(56) References Cited

U.S. PATENT DOCUMENTS

| | | | | |
|---|---|---|---|---|
| 4,730,134 | A | 3/1988 | Sistare | |
| 9,314,900 | B2 | 4/2016 | Vanko et al. | |
| 10,630,135 | B2 | 4/2020 | Sengiku et al. | |
| 12,076,846 | B2 * | 9/2024 | Fahrner | B25F 5/02 |

(Continued)

FOREIGN PATENT DOCUMENTS

| | | | |
|---|---|---|---|
| DE | 102016215660 | A1 | 2/2018 |
| DE | 102018110534 | A1 | 11/2018 |

(Continued)

OTHER PUBLICATIONS

WO-2018036720-A1 English Translation (Year: 2018).*

(Continued)

*Primary Examiner* — Makena S Markman

(74) *Attorney, Agent, or Firm* — Muncy, Geissler, Olds & Lowe, P.C.

(57) ABSTRACT

A handheld electric power tool, in particular an angle grinder, having a housing that comprises a first housing part and a second housing part, having an electric motor that is accommodated in the housing and drives a rotor shaft that is connected in a force-transmitting manner to an output unit accommodated in a gear head. A housing ring is provided that connects the first housing part to the second housing part at the front.

21 Claims, 4 Drawing Sheets

(56) References Cited

U.S. PATENT DOCUMENTS

| | | | | |
|---|---|---|---|---|
| 2009/0221222 | A1 | 9/2009 | Lo et al. | |
| 2011/0021120 | A1* | 1/2011 | Bogardi | B24B 23/02 451/344 |
| 2015/0111480 | A1* | 4/2015 | Vanko | B24B 47/12 310/50 |
| 2017/0106490 | A1 | 4/2017 | Privett, Jr. et al. | |
| 2018/0076745 | A1* | 3/2018 | Cox | B25F 5/02 |
| 2019/0358769 | A1* | 11/2019 | Miyazawa | B25F 5/02 |
| 2020/0384627 | A1* | 12/2020 | Numata | B24B 23/005 |
| 2021/0094164 | A1* | 4/2021 | Numata | B25F 5/008 |
| 2021/0099052 | A1* | 4/2021 | Suzuki | H02K 7/145 |
| 2022/0263377 | A1* | 8/2022 | Sasaki | H02K 7/116 |

FOREIGN PATENT DOCUMENTS

| | | | | |
|---|---|---|---|---|
| EP | 2873493 | A2 | 5/2015 | |
| WO | WO-2018036720 | A1 * | 3/2018 | B24B 41/007 |

OTHER PUBLICATIONS

International Search Report dated Mar. 18, 2021 in corresponding application PCT/EP2020/085002.

International Preliminary Report on Patentability dated May 17, 2022 in corresponding application PCT/EP2020/085002.

* cited by examiner

ELECTRIC HAND TOOL

This nonprovisional application is a continuation of International Application No. PCT/EP2020/085002, which was filed on Dec. 8, 2020, and which claims priority to German Patent Application No. 20 2019 106 967.8, which was filed in Germany on Dec. 13, 2019, and which are both herein incorporated by reference.

BACKGROUND OF THE INVENTION

Field of the Invention

The present invention relates to a handheld electric power tool, in particular an angle grinder, having a housing that comprises a first housing part and a second housing part, having an electric motor that is accommodated in the housing and drives a rotor shaft that is connected in a force-transmitting manner to an output unit accommodated in a gear head.

Description of the Background Art

Such handheld power tools have long been known from the prior art, for example from EP 2 873 493 A2, which corresponds to US 2015/0111480. In this case, the first housing part and the second housing part customarily are connected to one another by screws that are screwed in perpendicular to the rotor shaft, thereby connecting the two housing parts to one another and securing them against one another. Here, the electric motor, which frequently is designed as an EC motor and therefore includes a stator with multiple windings and a rotor with a rotor shaft, is accommodated and supported in the housing, wherein the rotor is supported in the stator so as to be rotatable about an axis of rotation. A laminated rotor core with a multiplicity of permanent magnets is held on the rotor shaft so that a rotating field, which drives the rotor, can be generated in the stator through appropriate activation in order to thereby drive an insertable tool such as an abrasive disk.

It has proven problematic in the handheld power tools known from the prior art, however, that, for the screw connection of the first housing part and the second housing part transverse to the rotor shaft of the electric motor, it is necessary to form screw bosses in the housing, which likewise are arranged to be perpendicular to the rotor shaft, in order to accommodate the screws of the screw connection. As a result, however, the outer circumference of the housing in the region where the electric motor is accommodated within the housing, and thus the grip size, becomes very large, which thus has an adverse effect on the ergonomics of the handheld power tool.

SUMMARY OF THE INVENTION

It is therefore an object of the present invention to reduce the above disadvantages and to provide an improved handheld power tool.

This object is attained according to an exemplary embodiment of the invention with a handheld power tool of the initially mentioned type by the means that a housing ring is provided that connects the first housing part to the second housing part at the front.

It is ensured by this means that the position of the two housing parts relative to one another is secured, specifically with no need for a screw connection of the two housing parts to be made transversely to the rotor shaft in the region at the front adjoining the gear head. It is possible to realize a small grip size, in particular, by this means.

It has also proven especially beneficial here when the housing ring at least partially overlaps the first housing part and/or the second housing part on the outer circumferential side. In this way, the two housing parts are ultimately held from the outside, which further enhances the securing action and at the same time also permits centering of the two housing parts relative to one another. Provision is also made within the scope of the invention, however, that the housing ring is overlapped by the two housing parts.

It has also proven worthwhile within the scope of the invention when the housing ring is arranged in an axially staggered manner between the housing and the gear head. This has advantages, in particular in terms of assembly, making it easier to connect the gear head to the housing. This means that the gear head is not directly in contact with the housing, but instead is spaced apart from and separated from the housing by the housing ring.

It has also proven advantageous when the housing ring is screwed to the first housing part and/or the second housing part, wherein the screw connection is made parallel to the rotor shaft. In this way, the two housing parts are thus firmly connected to the housing ring at their front end regions, which has a positive effect on the mechanical stability under load of the housing as a whole. It has also been shown to be beneficial in this context when the number of screws of the screw connection is preferably three or more, and further preferably five or fewer, and preferentially four.

In order to further reduce the assembly effort, it has then additionally proven advantageous when at least two screw seats, into which the screws of the screw connection are screwed, are formed in each of the first housing part and the second housing part. In this case, it has then also proven especially worthwhile when the screw connection passes through the gear head. In this way, a unit is then ultimately formed that is composed of the gear head, housing ring, and the two housing parts, and is secured by the screw connection.

It has also proven advantageous when projections in the manner of circular segments that at least partially cover the screw seats on the outer circumferential side are formed on the side of the housing ring facing the housing. In this way, additional securing of the screws of the housing parts is achieved, and at the same time it is also ensured that the screw seats are covered, achieving improved centering of the two housing parts relative to the housing ring.

It has also proven especially beneficial when the housing is vibration-decoupled from the housing ring and/or the gear head. This achieves the result that the vibrations arising during operation of the handheld power tool are not transmitted to the housing, and thus cannot have adverse effects on the user of the handheld power tool.

It has also proven beneficial when an air guide section, in which a fan that is attached to the rotor shaft is accommodated, is formed on the side of the housing ring facing away from the housing. Owing to the integration of the air guide section into the housing ring, a very compact construction is realized that makes it possible to keep the dimensions of the handheld power tool as small as possible.

It has also proven worthwhile when an axial collar, on which at least one guide section for the gear head is formed, is associated with the side of the housing ring facing away from the housing. In this way, an additional guide for the gear head is provided, which additionally permits centering and alignment of the gear head relative to the housing ring and therefore relative to the housing. In this context, it has then also proven advantageous when the number of guide sections is preferably two or more, preferentially three or more, and further preferably six or fewer, preferentially five or fewer, and especially preferentially four.

When the guide sections are formed in the manner of circular arcs, and when the angle of the individual guide sections is preferably 10° or more, preferentially 20° or more, especially preferentially 25° or more, and further preferably 50° or less, preferentially 40° or less, and especially preferentially 35° or less, and very especially preferentially 30°, then it is possible to further reduce manufacturing costs. In this context, it has then also proven worthwhile when the total angle of the guide sections is preferably 60° or more, preferentially 80° or more, especially preferentially 100° or more, and further preferably 250° or less, preferentially 180° or less, and especially preferentially 150° or less, and very especially preferentially 120°. As a result, only few regions of the axial collar must be matched to the shape of the gear head.

It has also proven especially beneficial when a guide for the motor is formed in the housing ring. The guide achieves the result that the motor can be guided, yet also radially secured and centered, in the housing ring, so that it is ultimately ensured that the electric motor is also aligned relative to the housing and the gear head, something that is further benefited by the circumstance that the guide is arranged to be concentric to the guide sections. It is ensured in this way that the gear head and the electric motor are also aligned relative to one another by the housing ring, relative to which both the electric motor and the gear head are ultimately aligned. "Concentric" here is understood within the scope of the invention to also mean, in particular, that the center points of the guide and of the guide sections lie on a common axis, wherein it has then been shown to be especially preferred when they lie on the axis of rotation. In this context, it has also proven advantageous, however, when the guide includes a contact surface for supporting a front face of the electric motor. The alignment of the electric motor relative to the housing ring is benefited in this way, as well.

Assembly can also be benefited by the means that the guide is formed as an annular axial rib that has a lead-in bevel on the inner circumferential side. This then achieves the result, in particular, that the electric motor can be placed in the guide in a simplified manner.

The alignment of the electric motor relative to the housing is benefited still further in that the housing ring is screwed to the electric motor by means of a motor screw connection. It has proven worthwhile in this context when the number of screws of the motor screw connection is preferably two or more, and further preferably four or fewer, and preferentially three. Consequently, the electric motor that is connected to the housing ring can be installed easily.

It has also proven especially beneficial when a motor housing, in which seats are formed into which the screws of the motor screw connection are screwed, is associated with the electric motor. In this way, it is ensured that sufficient space is available to form the threads. In particular, however, this also has the advantage that electrical insulation from the stator of the electric motor is achieved by the motor housing, ensuring that the housing ring is double-insulated from the stator. Provision is also made within the scope of the invention, however, that the screws are screwed into a different part of the electric motor, for example into the stator of the electric motor.

It has also been shown to be beneficial, however, when the seats formed in the motor housing extend essentially over the entire length of the motor housing. This has the advantage that the seat can serve to accommodate screws from both sides, and thus can also be used to screw an end cap to the motor housing, for example.

It has also proven especially beneficial, however, when the housing ring is formed as a housing cup that forms a receiving space to at least partially accommodate the electric motor. In this case, the housing ring can thus be extended, in particular axially, and ultimately formed as a cup in which the electric motor is at least partially accommodated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
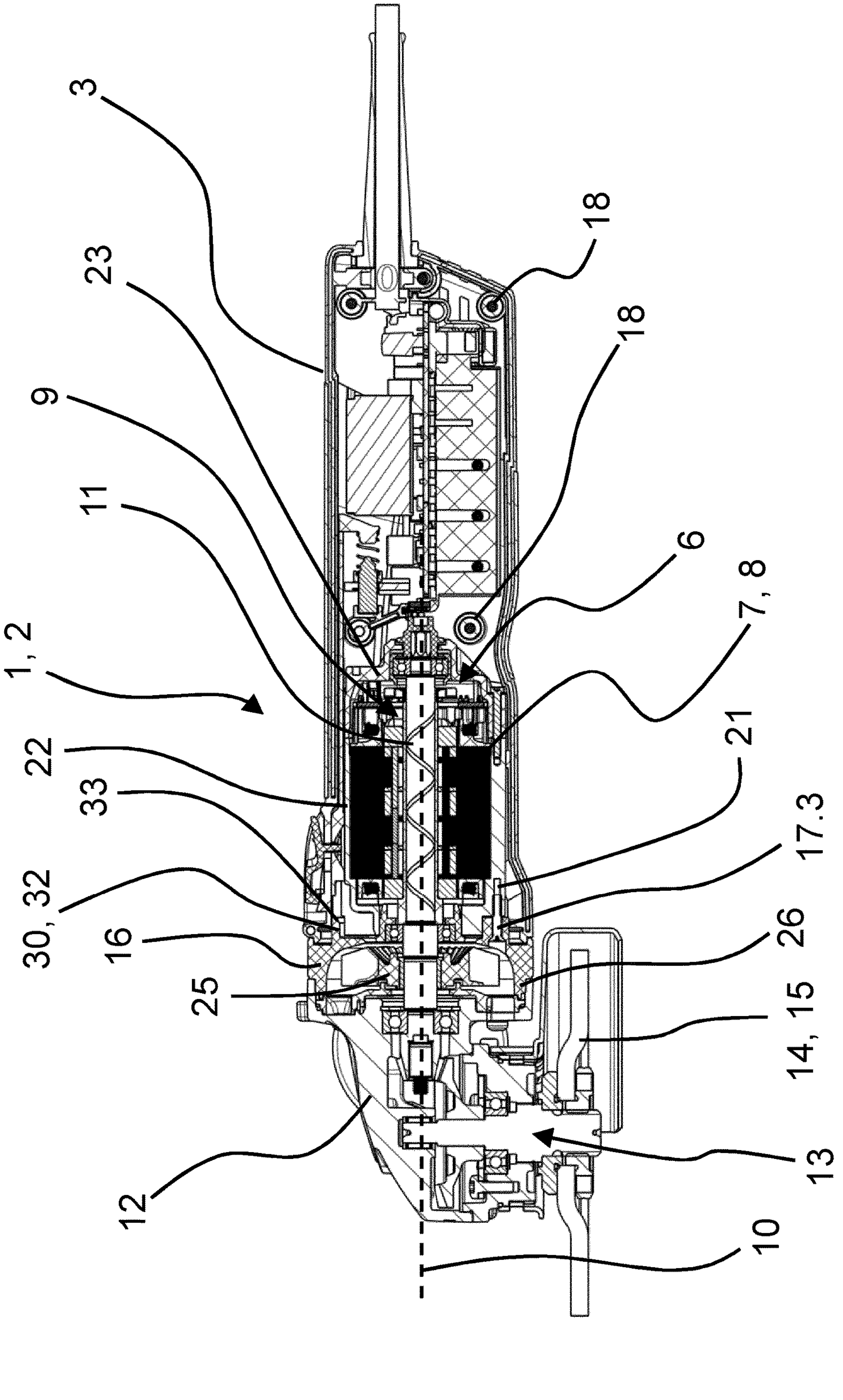
FIG. 1 is a sectional view along a longitudinal section through an exemplary embodiment of the handheld power tool.

FIG. 1 shows, in a sectional view along a longitudinal section of a handheld electric power tool 1, which in the exemplary embodiment shown is implemented as a corded angle grinder 2, which customarily is operated with voltages between 80 V and 280 V. The handheld power tool 1 in this case has a housing 3 that comprises a first housing part 4 and a second housing part 5, both of which are ultimately formed as half shells. Accommodated in the housing 3 is an electric motor 6, which is designed as an EC motor and includes a stator 8 having multiple windings 7 as well as a rotor 9 that is supported within the stator 8 so as to be rotatable about an axis of rotation 10. The electric motor 6 in this case drives a rotor shaft 11 that is connected to the rotor 9 and that is connected in a force-transmitting manner to an output unit 13 accommodated in a gear head 12. An insertable tool 14, which in the present case is implemented as an abrasive disk 15, is driven by the output unit 13. Arranged between the housing 3 and the gear head 12, which is to say at the front face of the first housing part 4 and the second housing part 5, is a housing ring 16 that at least partially overlaps the first housing part 4 and the second housing part 5 on the outer circumferential side, thereby ultimately clamping them in place. In addition to the securing of the first housing part 4 and the second housing part 5 by the housing ring 16, they are also screwed directly to one another. These housing screws 17.1 are arranged to be perpendicular to the rotor shaft 11 in this design, namely in the region of the housing 3 that faces away from the housing ring 16.

Figure 2:
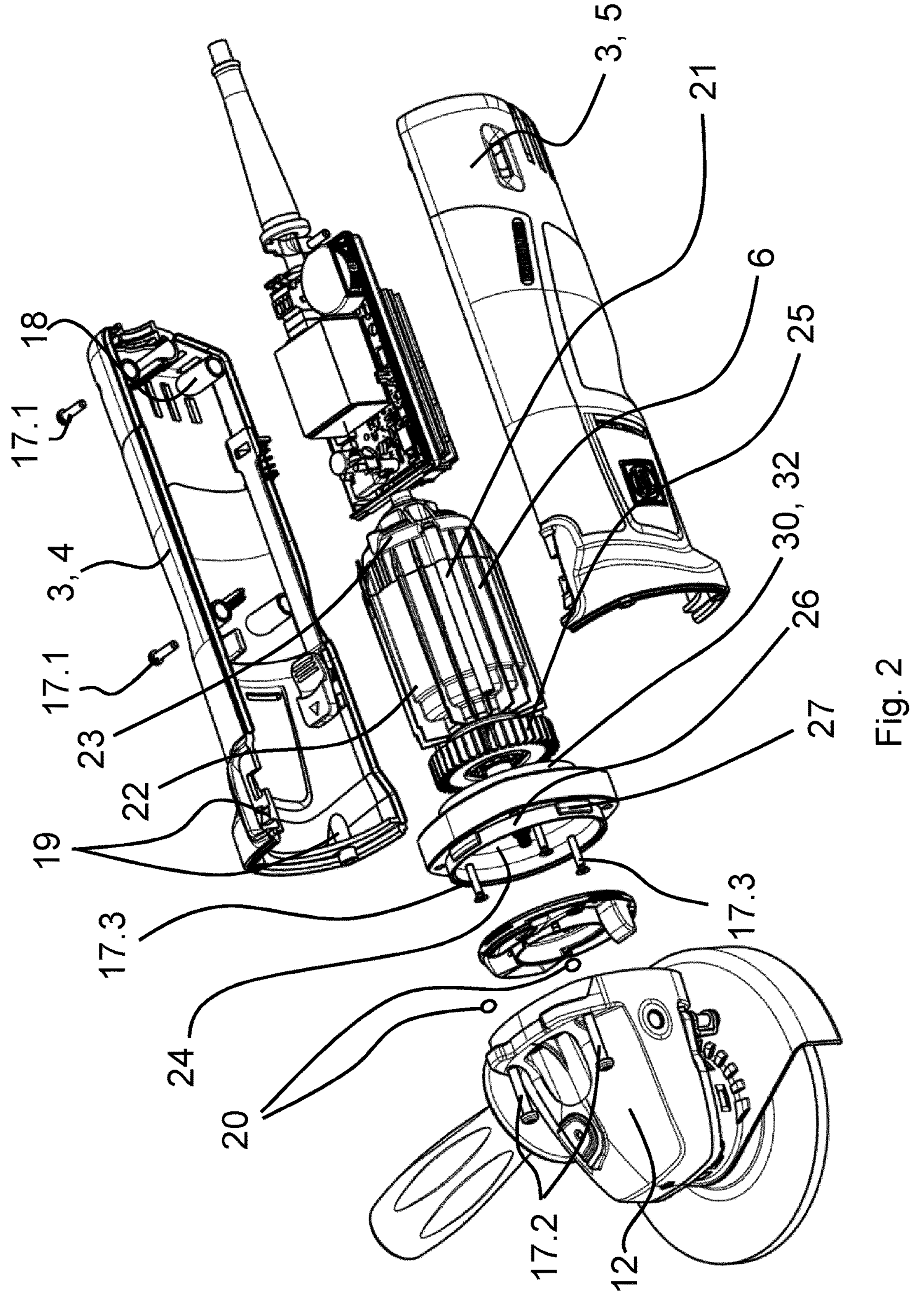
FIG. 2 is a perspective, exploded view of the exemplary embodiment of the handheld power tool.

As is evident from the exploded view in FIG. 2, in particular, the housing ring 16 is screwed to the first housing part 4 and the second housing part 5, wherein the screw connection is made parallel to the rotor shaft 11. In this way, it is possible to omit screw bosses 18 perpendicular to the rotor shaft 11 in the first housing part 4 and the second housing part 5 in the region at the front where the electric motor 6 is also accommodated. In all, four screws 17.2 are used, which are screwed in from the gear head 12, and ultimately connect the gear head 12, the housing ring 16, the first housing part 4, and the second housing part 5 to one another. In order to accommodate the screws 17.2 of the screw connection, two screw seats 19, into which the screws 17.2 of the screw connection are screwed, are formed in each of the first housing part 4 and the second housing part 5. However, it can also be seen from the exploded view shown in FIG. 2, in particular, that the housing 3 is vibration-decoupled from the housing ring 16 and the gear head 12. For this purpose, appropriate damping elements 20 are provided that are placed on the screws 17.2 and in this way contribute to an appropriate damping. In order to improve the centering of the electric motor 6 relative to the housing ring 16, the latter is screwed to the electric motor 6 by means of a motor screw connection. In this case, a total of three motor screws 17.3 are used, which are screwed from the side of the housing ring 16 facing the gear head 12 into seats 21 that are formed in a motor housing 22 in which the electric motor 6 is accommodated and encapsulated in a dustproof manner. These seats 21 extend essentially over the entire length of the motor housing 22 in this design, and also make it possible to attach an end cap 23 to the motor housing 22 in addition to the fastening of the housing ring 16.

Figure 3:
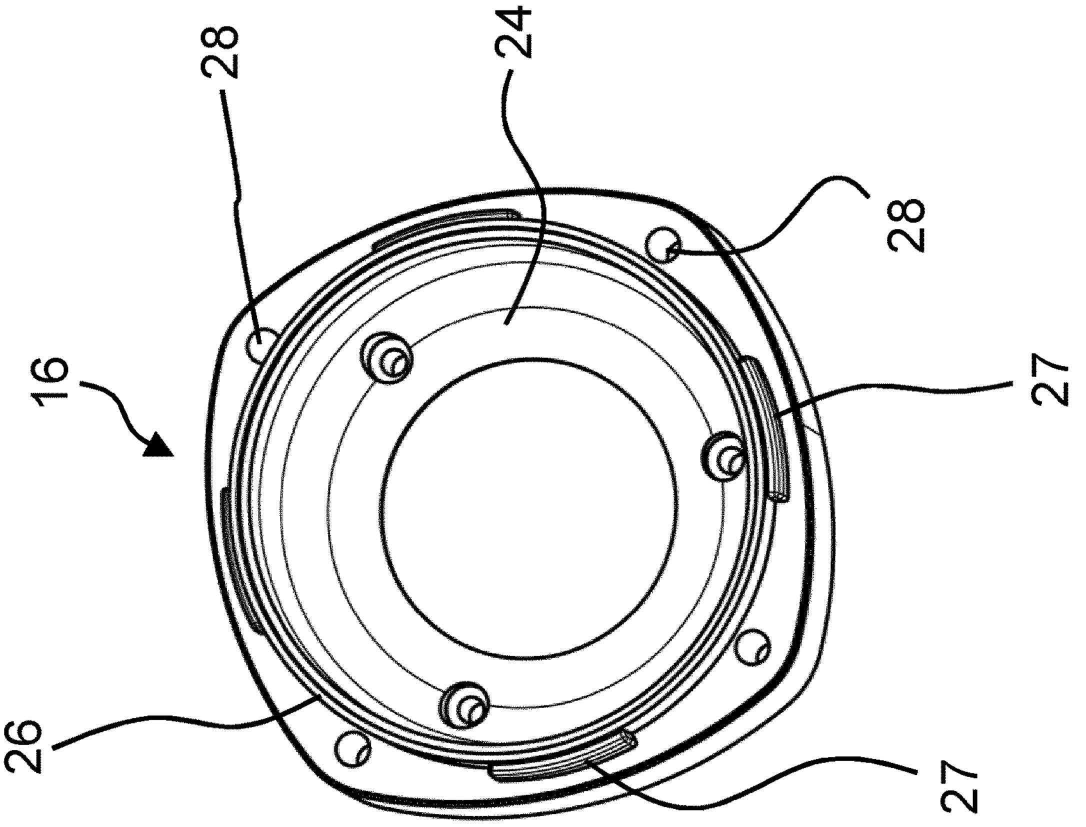
FIG. 3 is a perspective view of a first side of a housing ring of the handheld power tool.

An air guide section 24, in which a fan 25 is accommodated that is attached to the rotor shaft 11, is formed on the side of the housing ring 16 facing away from the housing 3, which is depicted in FIG. 3 as a perspective view. In addition, an axial collar 26, on which a total of four guide sections 27 for the gear head 12 are formed that permit alignment and centering of the gear head 12 relative to the housing 3 and the housing ring 16, is molded on the side of the housing ring 16 facing the gear head 12. The individual guide sections 27 are formed in the manner of circular arcs in this design and each have an angle of approximately 30°, so that the total angle of the four guide sections 27 as a whole is approximately 120°. Moreover, four screw holes 28 in all, which accommodate the screws 17.2 of the screw connection, are formed on the housing ring 16.

Figure 4:
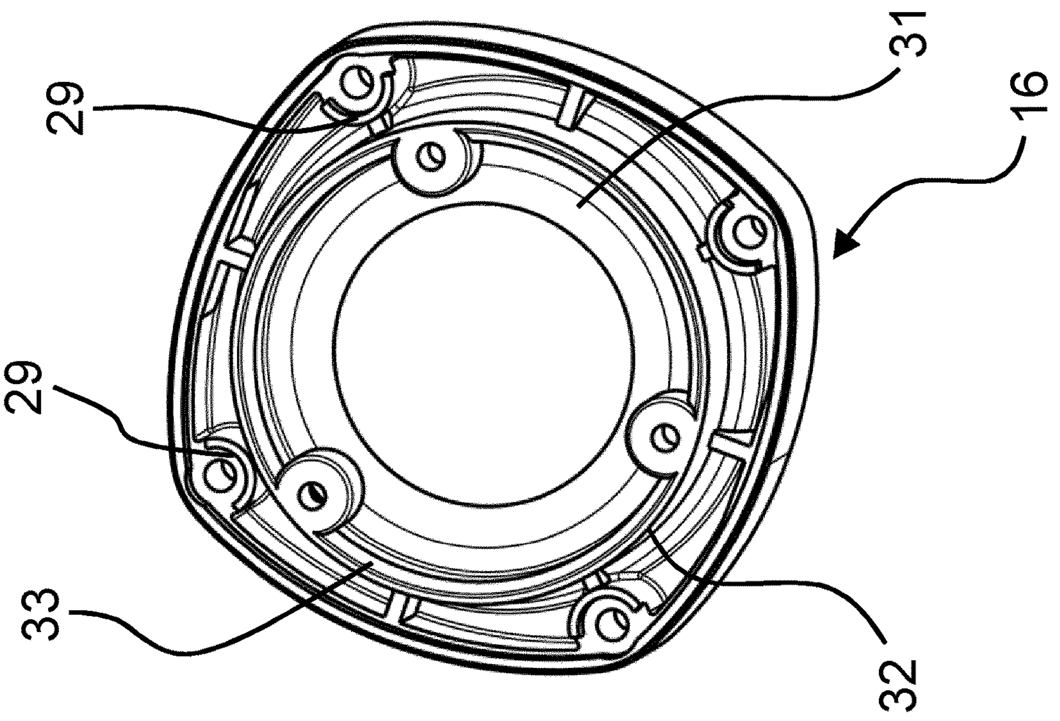
FIG. 4 is a perspective view of a second side of the housing ring of the handheld power tool.

It is evident from the perspective view of the housing ring 16 shown in FIG. 4, in particular, that projections 29 are formed on the side of the housing ring 16 facing the housing 3 in the region of the screw holes 28. In the assembled state, these projections 29, which are formed in the manner of circular segments, at least partially cover, on the outer circumferential side, the screw seats 19 that are formed in the first housing part 4 and the second housing part 5. Furthermore, it is also evident from FIG. 4 that a guide 30 for the electric motor 6 is formed in the housing ring 16. This guide has a contact surface 31 on which the electric motor 6 can be supported. The guide 30 is formed in this design as an annular axial rib 32 that has a lead-in bevel 33 on the inner circumferential side, thereby making it easier to insert the electric motor 6 into the housing ring 16.

Figure 5:
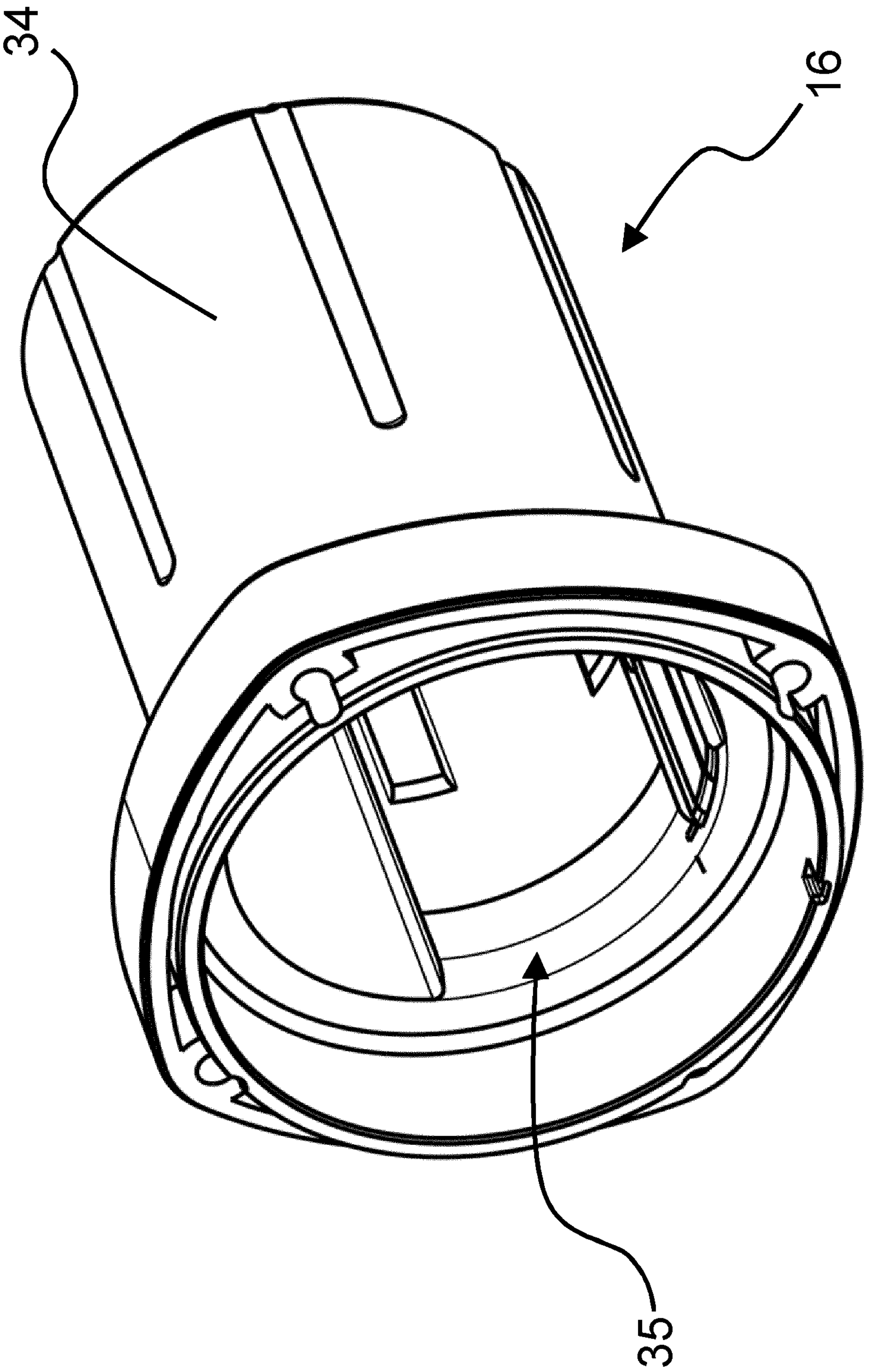
FIG. 5 is a perspective view of a cup-shaped housing ring.

FIG. 5 shows a perspective view of a second embodiment of the housing ring 16. This differs from the first embodiment according to FIGS. 1 to 4 essentially in that the housing ring 16 is formed as a housing cup 34, which is at least partially closed on an end face and forms a receiving space 35 in which the electric motor 6 can be at least partially accommodated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A handheld electric power tool comprising:

a gear head that accommodates an output unit;

a housing that comprises a first housing part and a second housing part, the first housing part and the second housing part being discrete, separate parts;

an electric motor accommodated in the housing, the electric motor driving a rotor shaft that is connected in a force-transmitting manner to the output unit accommodated in the gear head;

a housing ring that connects the first housing part to the second housing part at a front section of the housing;

a guide for the electric motor, the quide being formed in the housing ring; and a motor housing for the motor, the motor housing being discrete from the quide, wherein the housing ring is screwed to the first housing part and/or the second housing part via a housing screw connection, and wherein the housing screw connection is made substantially parallel to the rotor shaft, wherein the housing is vibration-decoupled from the housing ring and/or the gear head, wherein on a side of the housing ring that faces away from the housing, the housing ring has an axial collar, on which at least one quide section for the gear head is formed, wherein the at least one guide section protrudes radially from the axial collar to align and center the gear head relative to the housing ring, and wherein the guide is formed as an annular axial rib that has a lead-in bevel on an inner circumferential side.

2. The handheld power tool according to claim 1, wherein the housing ring at least partially overlaps the first housing part and/or the second housing part on an outer circumferential side.

3. The handheld power tool according to claim 2, wherein an air guide section, in which a fan that is attached to the rotor shaft is accommodated, is formed on a side of the housing ring facing away from the housing, such that the fan is accommodated on the side of the housing ring facing away from the housing.

4. The handheld power tool according to claim 1, wherein the housing ring is arranged in an axially staggered manner between the housing and the gear head.

5. The handheld power tool according to claim 1, wherein a number of screws of the housing screw connection is three to five screws.

6. The handheld power tool according to claim 1, wherein at least two screw seats, into which screws of the housing screw connection are screwed, are formed in each of the first housing part and the second housing part.

7. The handheld power tool according to claim 6, wherein projections formed as circular segments, which each at least partially cover a respective one of the screw seats on an outer circumferential side, are formed on a side of the housing ring facing the housing.

8. The handheld power tool according to claim 1, wherein the at least one guide section includes two to six guide sections.

9. The handheld power tool according to claim 8, wherein each of the guide sections are formed in the manner of circular arcs, and wherein an angle of each respective guide section is 10° to 50°.

10. The handheld power tool according to claim 9, wherein a total angle of the guide sections is 60° to 250°.

11. The handheld power tool according to claim 1, wherein the guide is arranged to be concentric to the guide sections.

12. The handheld power tool according to claim 1, wherein the guide includes a contact surface for supporting a front face of the electric motor.

13. The handheld power tool according to claim 1, wherein the housing ring is screwed to the electric motor via a motor screw connection.

14. The handheld power tool according to claim 13, wherein a number of motor screws of the motor screw connection is two to four screws.

15. The handheld power tool according to claim 14, wherein the electric motor has a motor housing, wherein the motor housing has screw seats, and wherein each respective one of the motor screws of the motor screw connection is screwed into a respective one of the screw seats of the motor housing.

16. The handheld power tool according to claim 15, wherein the screw seats formed in the motor housing extend essentially over an entire length of the motor housing.

17. The handheld power tool according to claim 1, wherein the housing ring is formed as a housing cup that forms a receiving space to at least partially accommodate the electric motor.

18. The handheld power tool according to claim 1, wherein the handheld power tool is an angle grinder.

19. The handheld power tool according to claim 1, wherein the housing is vibration-decoupled from the housing ring and/or the gear head by damping elements.

20. The handheld power tool according to claim 19, wherein the damping elements are O-rings placed on screws of the housing screw connection.

21. A handheld electric power tool comprising:
- a gear head that accommodates an output unit;
- a housing that comprises a first housing part and a second housing part, the first housing part and the second housing part being discrete, separate parts;
- an electric motor accommodated in the housing, the electric motor driving a rotor shaft that is connected in a force-transmitting manner to the output unit accommodated in the gear head;
- a housing ring that connects the first housing part to the second housing part at a front section of the housing;
- a guide for the electric motor, the guide being formed in the housing ring; and
- a motor housing for the motor, the motor housing being discrete from the guide,
- wherein on a side of the housing ring that faces away from the housing, the housing ring has an axial collar, on which at least one guide section for the gear head is formed,
- wherein the at least one guide section protrudes radially from the axial collar to align and center the gear head relative to the housing ring, and
- wherein the guide is formed as an annular axial rib that has a lead-in bevel on an inner circumferential side.

* * * * *